United States Patent [19]
Lee

(10) Patent No.: US 7,720,059 B2
(45) Date of Patent: May 18, 2010

(54) TRAFFIC EXCHANGING METHOD FOR MOBILE NODE IN MOBILE INTERNET PROTOCOL VERSION 6 (MIPV6) NETWORK

(75) Inventor: Jae-Hwoon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1123 days.

(21) Appl. No.: 11/357,193

(22) Filed: Feb. 21, 2006

(65) Prior Publication Data

US 2006/0198372 A1  Sep. 7, 2006

(30) Foreign Application Priority Data

Mar. 3, 2005  (KR)  ............... 10-2005-0017732

(51) Int. Cl.
*H04L 12/28* (2006.01)

(52) U.S. Cl. ............... 370/389; 370/349; 370/331; 455/436; 455/437; 455/439; 455/447

(58) Field of Classification Search .......... 370/331, 370/432, 401, 349, 400, 338, 254, 352, 328, 370/312; 709/250, 245, 220, 218, 227, 238; 455/435.1, 466, 437, 436

See application file for complete search history.

(56) References Cited

U.S. PATENT DOCUMENTS

2002/0191627 A1* 12/2002 Subbiah et al. ............. 370/428
2003/0225892 A1 12/2003 Takusagawa et al.
2006/0155878 A1* 7/2006 Narayanan et al. ......... 709/250
2007/0109997 A1* 5/2007 Hong et al. ................. 370/331

FOREIGN PATENT DOCUMENTS

| JP | 2002-261806 | 9/2002 |
|----|-------------|--------|
| JP | 2003-209873 | 7/2003 |
| JP | 2003-258815 | 9/2003 |
| JP | 2003-318943 | 11/2003 |
| JP | 2004-015143 | 1/2004 |
| JP | 2004-260619 | 9/2004 |

OTHER PUBLICATIONS

Non Patent Literature: Hierarchical MIPv6 mobility management, published Jul. 2002, by IETF Mobile IP working group. See Whole Document.*

(Continued)

*Primary Examiner*—Pankaj Kumar
*Assistant Examiner*—Yosief Berhane
(74) *Attorney, Agent, or Firm*—H.C. Park & Associates, PLC

(57) ABSTRACT

A traffic exchanging method for a mobile node in a mobile network reduces packet loss during hand-over latency, and defines new messages in order to prevent packet disorder. By defining a message indicating that earlier received packets have all been delivered, it is possible to prevent packet disorder. This has an effect of reducing packet loss and preventing packet disordering while a mobile host exchanges traffic in a mobile network. This solves the performance degradation of application layer protocol caused by packet disordering.

12 Claims, 14 Drawing Sheets

OTHER PUBLICATIONS

Ogawa et al., "A Studay on Seamless Handover Method Using Enhanced DHCP", IEICE technical Report, vol. 104, No. 516, pp. 27-30, The Institute of Electronics, Information and Communication Engineers.

Decision of Grant from Japanese Patent Office issued in Applicant's corresponding Japanese Patent Application No. 2006-055885 dated Dec. 24, 2008.

European Office Action of the European Patent Application No. 06 00 4215, issued on Apr. 25, 2006.

An article "A Performance Comparison of Mobile IPv6, Hierarchical Mobile IPv6, Fast Handovers for Mobile IPv6 and their Combination" written by Perez-Costa, et al., published in Mobile Computing and Communications Review, vol. 7, No. 4, on Oct. 4, 2003.

"*A Study on Delay and Jitter Reduction in Hand-Off Methods for Mobile IPv6*" Mizuguchi et al., Dept. of Communications and Integrated Systems, Graduate School of Science and Engineering, Tokyo Institute of Technology, vol. 103 No. 425, Nov. 7, 2003.

*The Office Action* from the Japanese Patent Office issued in Applicant's corresponding Japanese Patent Application No. 2006-055885 dated Jul. 29, 2008.

\* cited by examiner

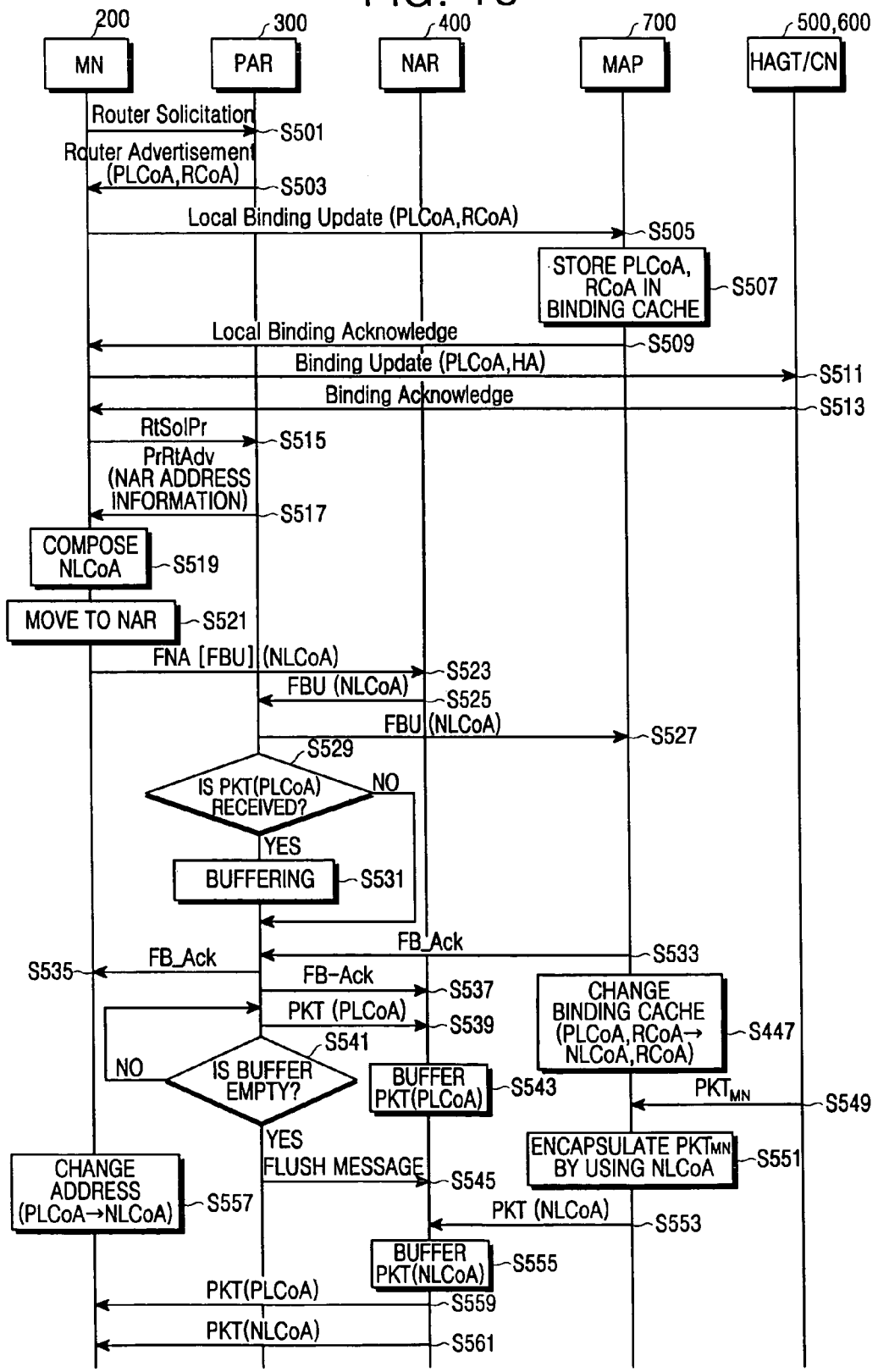

TRAFFIC EXCHANGING METHOD FOR MOBILE NODE IN MOBILE INTERNET PROTOCOL VERSION 6 (MIPV6) NETWORK

CLAIM OF PRIORITY

This application makes reference to and claims all benefits accruing under 35 U.S.C. §119 from an application for TRAFFIC EXCHANGING METHOD FOR MOBILE NODE IN MOBILE IPv6 NETWORK earlier filed in the Korean Intellectual Property Office on Mar. 3, 2005 and there duly assigned Serial No. 2005-17732.

BACKGROUND OF THE INVENTION

1. Field of the Invention

The present invention relates to a Mobile Internet Protocol version 6 (MIPv6) network, and more particularly, the present invention relates to a method of exchanging traffic for a mobile node in a MIPv6 network.

2. Description of the Related Art

The present Internet is based upon Internet Protocol version 4 (IPv4). According to IPv4, a source sends a source address and a destination address on a packet to the Internet in order to transmit traffic to a destination. An IP address used in IPv4 is composed of 32 bits so that about 4 billion (4,000,000,000) hosts can access the Internet. However, the actual number of hosts capable of accessing the Internet is remarkably small because of special addressing, sub-netting and network address allocation. In addition, owing to the generalization of the Internet and an increase in multimedia traffic, unlike in the past, endeavors have been continuously made so that various devices such as mobile nodes, information home electronics and so on in addition to computers can access the Internet. Such mobile nodes and information home electronics such as televisions and refrigerators are of a vast number, and thus, IPv4 addresses have become insufficient for such devices to access the Internet. Accordingly, IPv6 technology was proposed to solve the insufficient IP addresses and complement the inefficiency of IPv4 so as to improve Internet performance.

IPv6 has a 128 bit address system. Thus, this address system has many more IP addresses than the 32 bit address system of IPv4. The address system increased to 128 bits also increases the contents of a routing table, which are essential for path determination at a router. This can increase the time consumed to find a suitable route. However, since the IPv6 address system has many more layers than the IPv4 address system, the increased time consumed to find a suitable route from the routing table is small.

Since IPv6 has improved performance over IPv4, IPv6 can solve Internet performance related problem owing to the rapid increase in Internet traffic and the generalization of multimedia traffic.

The IP address allocated to a host or node is composed of network identifier and host identifier. The network identifier is information for uniquely indicating a network to which the host is connected, and the host identifier is information for uniquely identifying the host in the corresponding network. The host allocated with the IP address generates a socket address by using the IP address and port number of a transmission layer, and establishes a connection to another host by using such socket information.

Therefore, once one host or host 1 has established a connection with another host or host 2, a constant IP address should be fixedly maintained to the host while the connection is established.

However, if one host connected to another host moves to another network, the network identifier should be changed, and the IP address allocated to the host must also be changed. Changing the IP address means changing the socket address, terminating all previously established connections, and thus, the host disadvantageously has to again attempt a connection.

In order to solve the problem of connection termination occurring when a host changes a network as above, the Internet Engineering Task Force (IETF) proposes a Mobile IPv6 (hereinafter referred to as 'MIPv6') protocol. The MIPv6 protocol proposes a method for enabling a Mobile Node (hereinafter referred to as 'MN') to continuously maintain previously-established connections even though the MN changes its location. That is, the MIPv6 protocol defines a mechanism by which even though the MN, which has connected to the Internet with has established connection to a Correspondent Node (hereinafter referred to as 'CN'), changes its Access Point (AP), the MN can maintain a connection to the CN.

However, when an MN moves from an MIPv6 network to a new network, a predetermined time is consumed until the MN is provided with Internet access service from the new network. Such a time is referred to as hand-over latency, which includes a time period until recognizing that the MN has moved to the new network, a time period until composing a new address from the new network and a time period necessary for registering the composed new address.

Accordingly, when the MN has moved from the MIPV6 network, any packet sent during such hand-over latency is transmitted to the previous address, which the MN has accessed before hand-over, and thus the packet is lost. Thus, packet loss increases in proportion to hand-over latency.

In order to solve such problems and reduce hand-over latency, Hierarchical MIPv6 (hereinafter referred to as 'HMIPv6') and Fast hand-over for MIPv6 (hereinafter referred to as 'FMIPv6') have been proposed.

HMIPv6 defines a router having new functions so-called Mobile Anchor Point (MAP), in which a set of ARs having same MAP information is referred to as a MAP domain. When the MN moves within the MAP domain, address change is reported merely to the MAP to reduce binding update time and resultantly reducing hand-over latency.

When HMIPv6 is used, additional registration procedures can be omitted at hand-over in the same MAP domain. Thus, it is possible to reduce hand-over latency at hand-over in the same MAP domain. However, event this process cannot completely eliminate hand-over latency. That is, when the MN moves, hand-over latency occurs, so that the packets are still discarded. Thus, problems of packet loss still take place even in the HMIPv6 network.

As another solution to reduce hand-over latency, there is FMIPv6. FMIPv6 uses a system configuration of an MIPv6 network as is. FMIPv6 can previously process information before the movement of the MN to a new network in order to reduce hand-over latency as well as minimize packet loss.

However, if it takes a long time for the MN to move or if a binding update time is delayed so that a number of packets are buffered, then some of the packets are delivered to the MN before all of the buffered packets are delivered to the MN.

This can cause problems in that the packets are delivered to the MN in the wrong order. This wrong order of the packets can remarkably degrade the performance of an application program. When the packets are received in the wrong order, a receiving side of the packets generates an acknowledgment signal requesting packets in the correct order. This as a result causes a duplicated acknowledgment, and when a transmitting TCP receives 3 or more duplicated acknowledgments, the transmitting TCP promptly changes into a retransmission and recovery state. In this state, the transmitting TCP retransmits its own traffic and reduces the size of a congestion window. The reduced congestion window size also degrades the transmitting TCP performance.

Also, in case of UDP based multimedia traffic, packet loss or packet disordering considerably degrades quality.

Therefore, where the MN moves to a new network, a mechanism capable of preventing not only packet loss but also packet disordering is essential.

SUMMARY OF THE INVENTION

It is an object of the present invention to provide a traffic exchanging method designed to reduce packet loss as well as prevent packet disordering in an MIPv6 network.

It is another object of the invention to provide a traffic exchanging method designed to improve application layer protocol performance in an MIPv6 network.

According to one aspect of the invention for realizing the above objects, a method of exchanging traffic for a mobile node in a mobile network is provided, the method comprising: upon receiving a request from a mobile node connected to a first router using a first dynamic address and having received a link layer signal from an access point connected to a second router, the first router provides network information of the second router to the mobile node as an acknowledgment to the request from the mobile node; receiving second dynamic address of the mobile node by the first and second routers using the network information of the second router; first buffering a packet headed for the first dynamic address by the first router; confirming whether or not the second dynamic address is available by the second router; executing a fast binding update of the mobile node using the second dynamic address and delivering a fast binding update complete message to the first router upon a determination by the second router that the second dynamic address is available; transmitting the packet buffered by the first router from the first router to the second router as an acknowledgment to the fast binding update complete message, and delivering a Flush message to the second buffer upon the packet buffered by the first router being completely transmitted to the second router; second buffering the packet transmitted from the first router by the second router; receiving and third buffering a packet headed for the second dynamic address by the second router; delivering the packet buffered by the second buffering from the second router to the mobile node as an acknowledgment to a delivered movement complete message indicating the movement of the mobile node from the first router to the second router; and delivering the packet buffered by the third buffering from the second router to the mobile node upon receiving the Flush message.

The method preferably further comprises: forming a local home agent connecting the first and second router into an intranet and generating a local dynamic address of the mobile node using network information of the local home agent; executing a local binding update by storing the first dynamic address and the local dynamic address of the mobile node in the local home agent; and executing a binding update by storing home address and the local dynamic address of the mobile node in a home agent.

The transmission complete message preferably comprises: a source address field storing an address of the first router; a destination address field storing the second dynamic address; and a field storing flag information indicating the completed transmission.

The method preferably further comprises changing local update information stored in the local home agent using the second dynamic address, upon a determination by the second router that the second dynamic address is available.

Changing local update information stored in the local home agent preferably comprises mapping the second dynamic address with the local dynamic address.

The method preferably further comprises changing the destination of a packet headed for home address of the mobile node to the second dynamic address and delivering the packet to the second router by the local home agent, upon the local home agent receiving the packet headed for home address of the mobile node.

According to another aspect of the invention for realizing the above objects, a method of exchanging traffic for a mobile node in a mobile network is provided, the method comprising: upon receiving a request from a mobile node connected to a first router using a first dynamic address and having received a link layer signal from an access point connected to a second router, the first router provides network information of the second router to the mobile node as an acknowledgment to the request from the mobile node; receiving second dynamic address of the mobile node by the second router using network information of the second router and a movement complete message of the mobile node; delivering the second dynamic address of the mobile node from the second router to the first router; first buffering a packet headed for the first dynamic address by the first router; executing a fast binding update of the mobile node using the second dynamic address and delivering a fast binding update complete message to the first router; transmitting the packet buffered by the first router from the first router to the second router as an acknowledgment to the fast binding update complete message, and delivering a Flush message upon the packet buffered by the first router being completely transmitted to the second router; second buffering the packet transmitted from the first router by the second router; receiving and third buffering a packet headed for the second dynamic address by the second router; delivering the packet second buffered by the second router from the second router to the mobile node; and delivering the packet third buffered by the second router from the second router to the mobile node upon receiving the Flush message.

The method preferably further comprises: forming a local home agent connecting the first and second router into an intranet and generating a local dynamic address of the mobile node using network information of the local home agent; executing a local binding update by storing the first dynamic address and the local dynamic address of the mobile node in the local home agent; and executing a binding update by storing home address and the local dynamic address of the mobile node in a home agent.

The transmission complete message preferably comprises: a source address field storing an address of the first router; a destination address field storing the second dynamic address; and a field storing flag information indicating the completed transmission.

The method preferably further comprises changing local update information stored in the local home agent using the second dynamic address, upon a determination by the second router that the second dynamic address is available.

Changing local update information stored in the local home agent preferably comprises mapping the second dynamic address with the local dynamic address.

The method preferably further comprises changing the destination of a packet headed for home address of the mobile node to the second dynamic address and delivering the packet to the second router by the local home agent, upon the local home agent receiving the packet headed for home address of the mobile node.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein:

FIG. 15 is a diagram of traffic exchange procedures of an MN in a MIPv6 network according to another embodiment of the present invention.

DETAILED DESCRIPTION OF THE INVENTION

Figure 1:
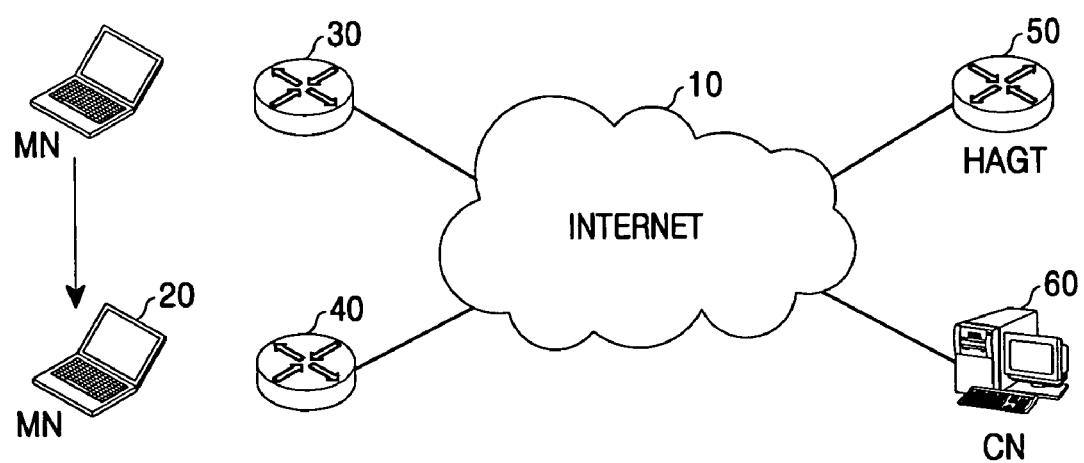
FIG. 1 is a diagram of a Mobile Internet Protocol version 6 (MIPv6) network adopting a MIPv6 protocol.

FIG. 1 is a diagram of an example of an MIPv6 network adopting an MIPv6 protocol. Referring to FIG. 1, a system for the MIPv6 network includes Access Routers (hereinafter referred to as 'ARs') 30 and 40 for providing Internet access service to an MN 20 and a Home AGenT (hereinafter referred to as 'HAGT') 50 for managing the home address of the MN 20 with a network address identical to the home address of the MN 20. An AR 30 is called a Previous AR (hereinafter referred to as 'PAR'), and provides Internet access service to the MN 20 before the MN 20 roams. An AR 40 is called a New AR (hereinafter referred to as 'NAR'), and provides Internet access service to the MN 20 after the MN 20 has roamed. A CN 60 is a node or host connected to the MN 20 via the Internet 10.

The MIPv6 network system allocates a fixed IP address as a Home Address (hereinafter referred to as 'HA') to the MN 20, and registers the HA to the HAGT 50 having a network address identical to the HA of the MN 20.

The MN 20 is allocated with a Care-of Address (CoA) as a new dynamic IP address from an AR (i.e., NAR) existing in a new network whenever changing an AP of the network, and registers its HA and CoA in the HAGT 50.

The CN 60, advised of previous address (e.g., HA) of the MN 20, encapsulates data to be transmitted to the MN 20 by using address information of the MN 20. Then, the data is transmitted to a home network of the MN 20, and the HAGT 50, advised of previous address (e.g., HA) and new address (CoA) of the MN 20, encapsulates the data once more by using the new address (CoA) and transmits the data to the MN 20.

Figure 2:
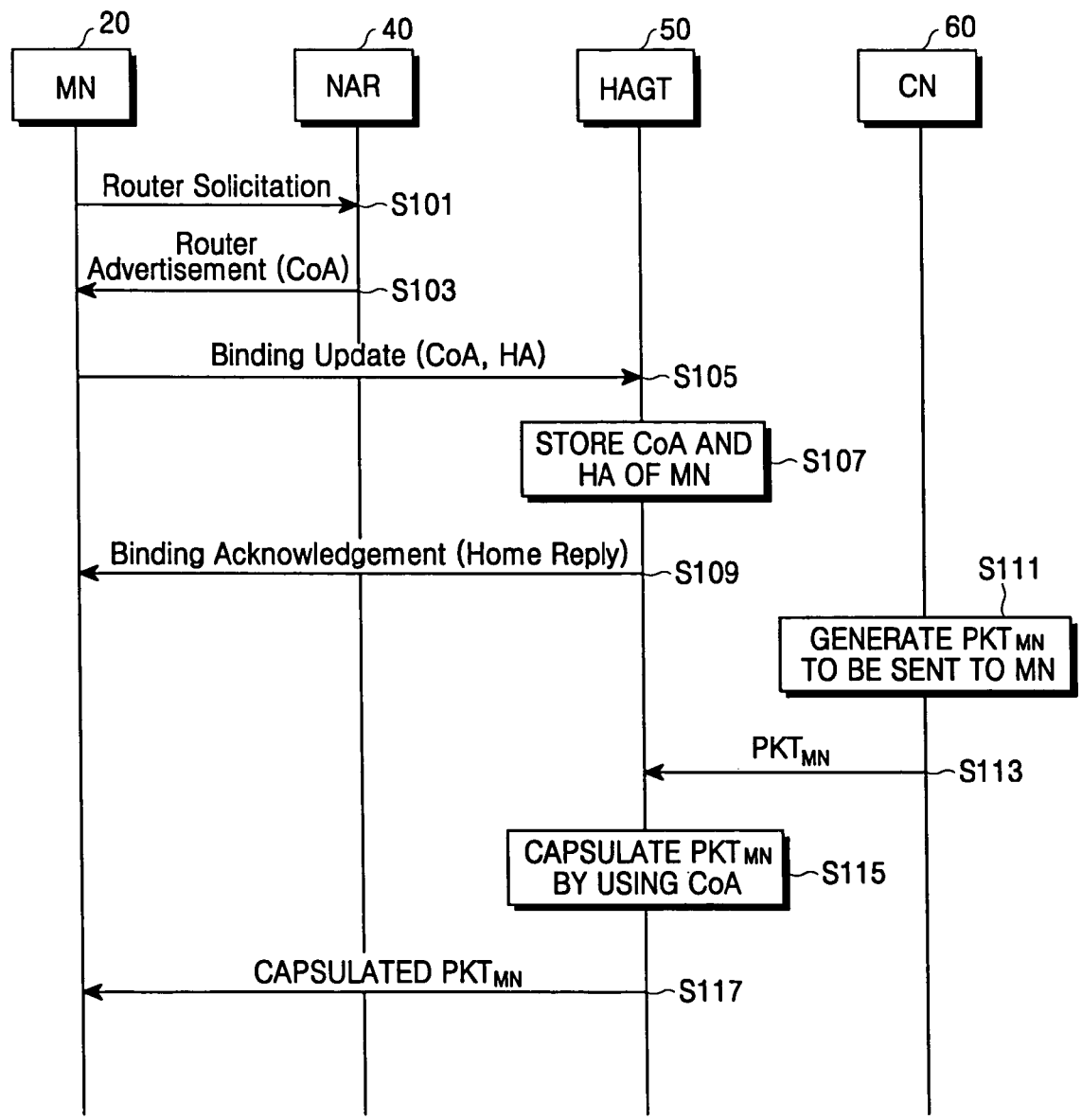
FIGS. 2 and 3 are diagrams of traffic exchange procedures of an MN in a MIPv6 network.

Such procedures are illustrated in FIG. 2, which shows an example of traffic exchange procedures according to bi-directional tunneling of an MIPv6 traffic exchange.

Referring to FIGS. 1 and 2, when the MN 20 moves or roams from the PAR 30 to the NAR 40, the MN 20 requests network information from the NAR 40 (router solicitation) in S101, receives a router advertisement from the NAR 40, generates dynamic address (CoA) S103, and delivers its HA and CoA to the HAGT 50 in S105. The MN 20 utilizes a binding update message to deliver the HA and CoA.

Then, the HAGT 50 stores the HA and CoA of the MN 20 in a binding cache in S107, and delivers a binding acknowledgment message to the MN 20 in S109. Such procedures of the MN 20 for registering the HA and CoA in the HAGT 50 are referred to as 'address registration.'

If the CN 60 has data to transmit to the MN 20, the CN 60 generates a packet (PKTMN) to be sent to the MN 20 using the HA of the MN 20 in S111, and delivers the data to the HAGT 50 of the MN 20 in S113. Then, the HAGT 50 detects the CoA of the MN 20 based upon information stored in the binding cache in S107 above and encapsulates the PKTMN using the CoA in S115, and delivers the encapsulated PKTMN to the MN 20 in S117.

Such bi-direction tunneling does not need any function for the CN 60 to provide MIPv6. That is, according to this process, the destination address of a packet transmitted from the CN 60 to the MN 20 is the HA of the MN 20. Thus, this packet is transmitted to the home network of the MN 20, and the HAGT 50 receives the packet, and after tunneling using the CoA of the MN 20, transmits the packet to the MN 20. In addition, a packet transmitted from the MN 20 to the CN 50 60 is first transmitted to the HAGT 50 via tunneling (which is called reverse tunneling), and delivered from the HAGT 50 to the CN 60 along a normal path.

Figure 3:
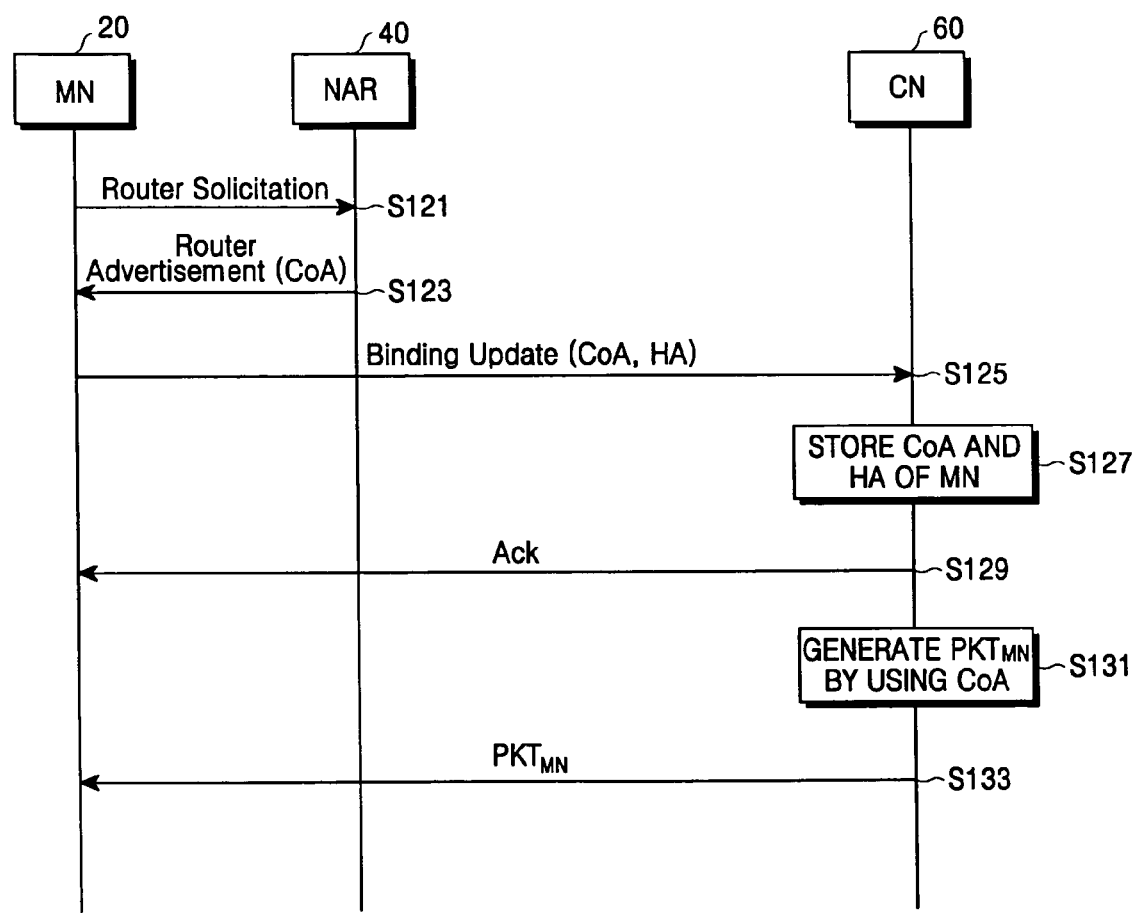

FIG. 3 is an example of traffic exchange procedures according to 'optimization' of MIPv6 traffic exchange.

Referring to FIGS. 1 and 3, when the MN 20 moves or roams from the PAR 30 to the NAR 40, the MN 20 requests a dynamic address (CoA) from the NAR 40 in S121, and as a response to the request, receives a CoA from the NAR 40 (i.e., router advertisement) in S123.

Upon receiving the CoA from the NAR 40, the MN 20 delivers its HA and CoA to the CN in S125. Then, the CN 60 stores the HA and CoA of the MN 20 in S127, and delivers a binding acknowledgment message ('Ack') to the MN 20 in S129.

If the CN 60 has data to transmit to the MN 20, the CN 60 generates a packet (PKTMN) to be sent to the MN 20 using the CoA of the MN 20 in S131, and directly transmits the PKTMN to the MN 20 in S133.

In such optimization, the MN 20 registers the HA and CoA in the CN 60. Accordingly, when the CN 60 attempts to transmit a packet to the MN 20, the CN 60 first confirms whether or not a CoA of the MN 20 exists in binding information of the CN 60. If a CoA of the MN 20 exists, then the CN 60 generates a packet by using address information (CoA) and transmits the packet to the MN 20. Also, a packet from the MN 20 can be directly transmitted to the CN 60 without passing through the HAGT 50.

However, when the MN 20 moves from an MIPv6 network to a new network, there is a predetermined time period until the MN 20 is provided with Internet access service from the new network. Such a time is referred to as a hand-over latency, which includes a time period until recognizing that the MN 20 has moved to the new network, a time period until composing a single CoA from the new network and a time period necessary for registering the composed CoA in the HAGT or CN.

Accordingly, when the MN 20 has moved from the MIPV6 as shown in FIG. 1, any packet sent from the HAGT 50 or the CN 60 during such a hand-over latency is transmitted to the PAR 30, which the MN 20 has accessed before hand-over, and thus the packet is lost. Thus, packet loss increases in proportion to the hand-over latency.

In order to solve such problems and reduce the hand-over latency, Hierarchical MIPv6 (hereinafter referred to as 'HMIPv6') and Fast hand-over for MIPv6 (hereinafter referred to as 'FMIPv6') have been proposed.

HMIPv6 defines a router having new functions including a so-called Mobile Anchor Point (MAP), in which a set of ARs having the same MAP information is referred to as a MAP domain. When the MN moves within the MAP domain, an address change is reported merely to the MAP to reduce the binding update time and thereby reducing the hand-over latency. An example of such an HMIPv6 network is illustrated in FIG. 4.

Figure 4:
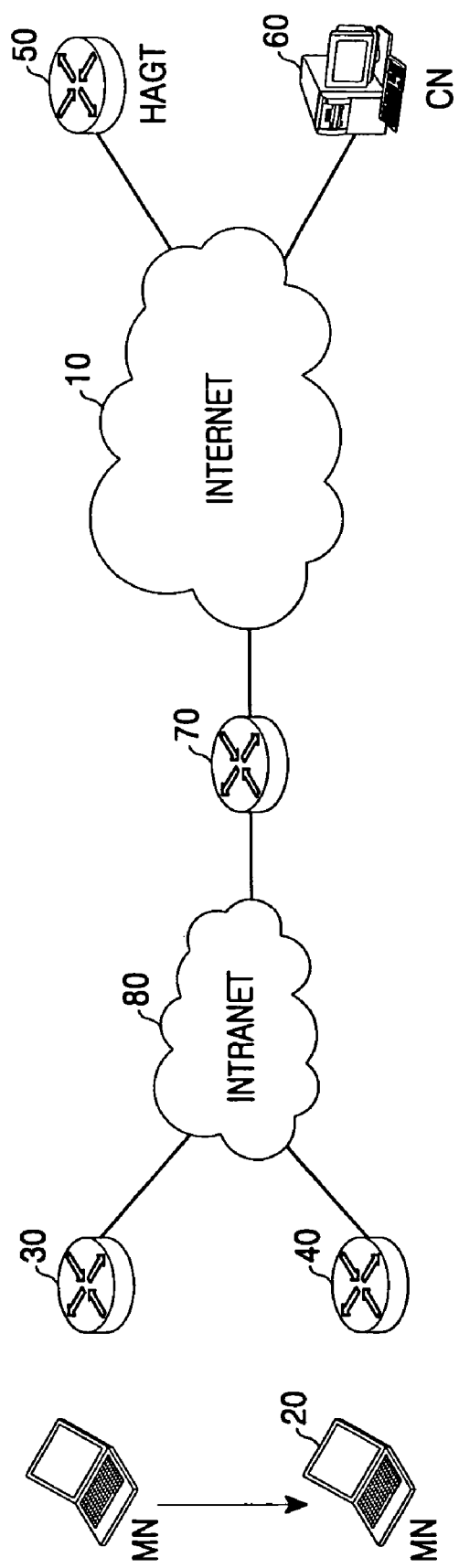
FIG. 4 is a diagram of a hierarchical MIPv6 network.

Referring to FIG. 4, a system for the HMIPv6 network provides a MAP 70 between routers 30 and 40 for managing Internet access of the MN 20 and the Internet 10 to form an intranet 80 of the routers 30 and 40 based upon the MAP 70. The MAP 70 acts as a type of 'local home agent' in a MAP 70 domain.

In an HMIPv6 system having the above structure, the MN 20 is allocated a plurality of dynamic addresses. For example, when the MN 20 moves from another MAP domain to a domain of the MAP 70, the MN 20 is allocated a Local CoA (hereinafter referred to as a 'LCoA') from the PAR 30 and a Regional CoA (hereinafter referred to as a 'RCoA') from the MAP 70. The LCoA and RCoA of the MN 20 are stored in the MAP 70 and the RCoA and HA are registered in the HAGT 50 to execute a binding update. When the MN 20 moves within the MAP 70 domain, the LCoA of the MN 20 is changed whereas the RCoA of the MN 20 is not changed. Therefore, when the MN 20 moves in the MAP 70 domain, the HAGT 50 may not be informed.

Figure 5:
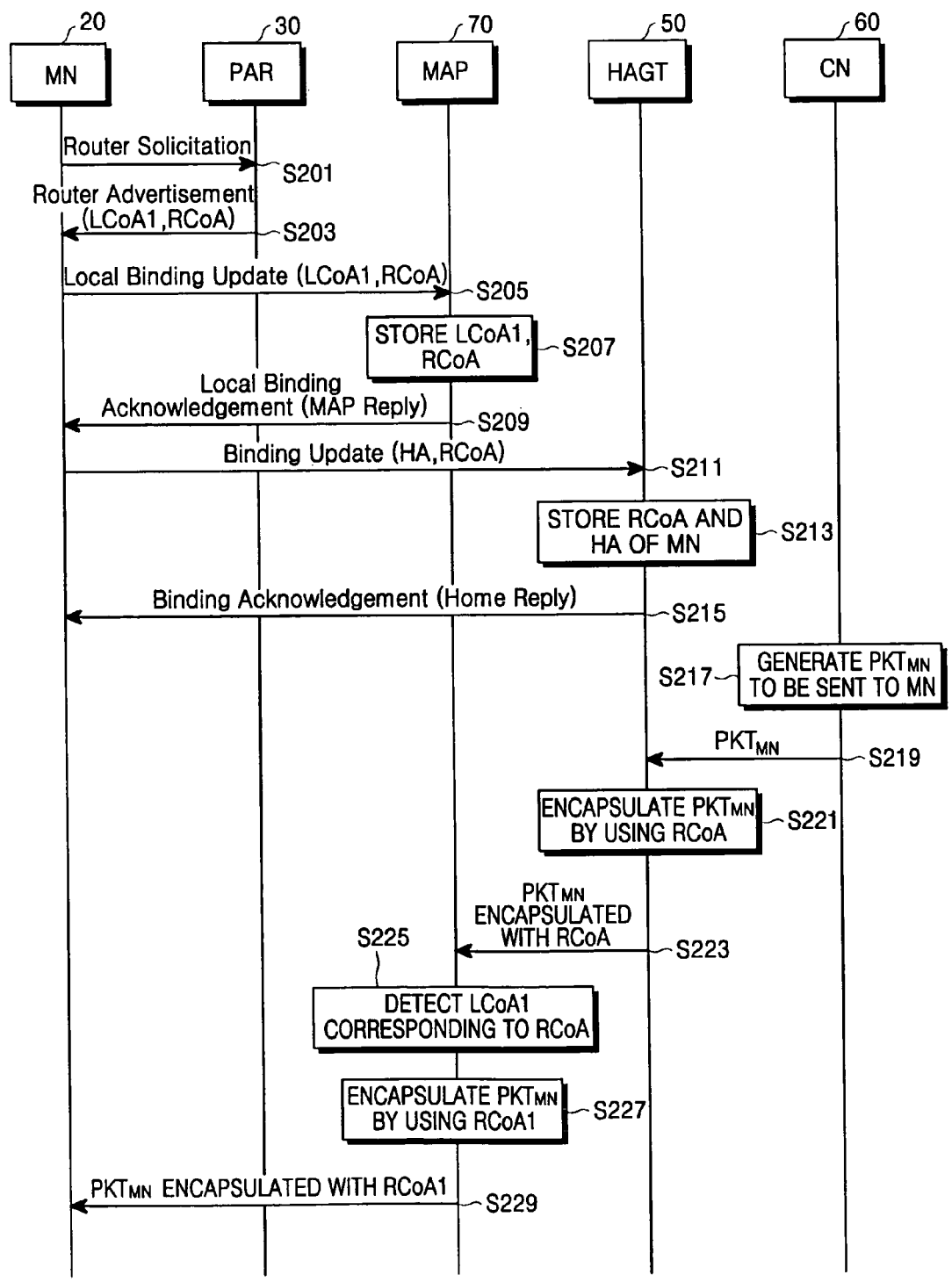
FIGS. 5 and 6 are diagrams of traffic exchange procedures of a Mobile Network (MN) in a hierarchical MIPv6 network.
Figure 6:
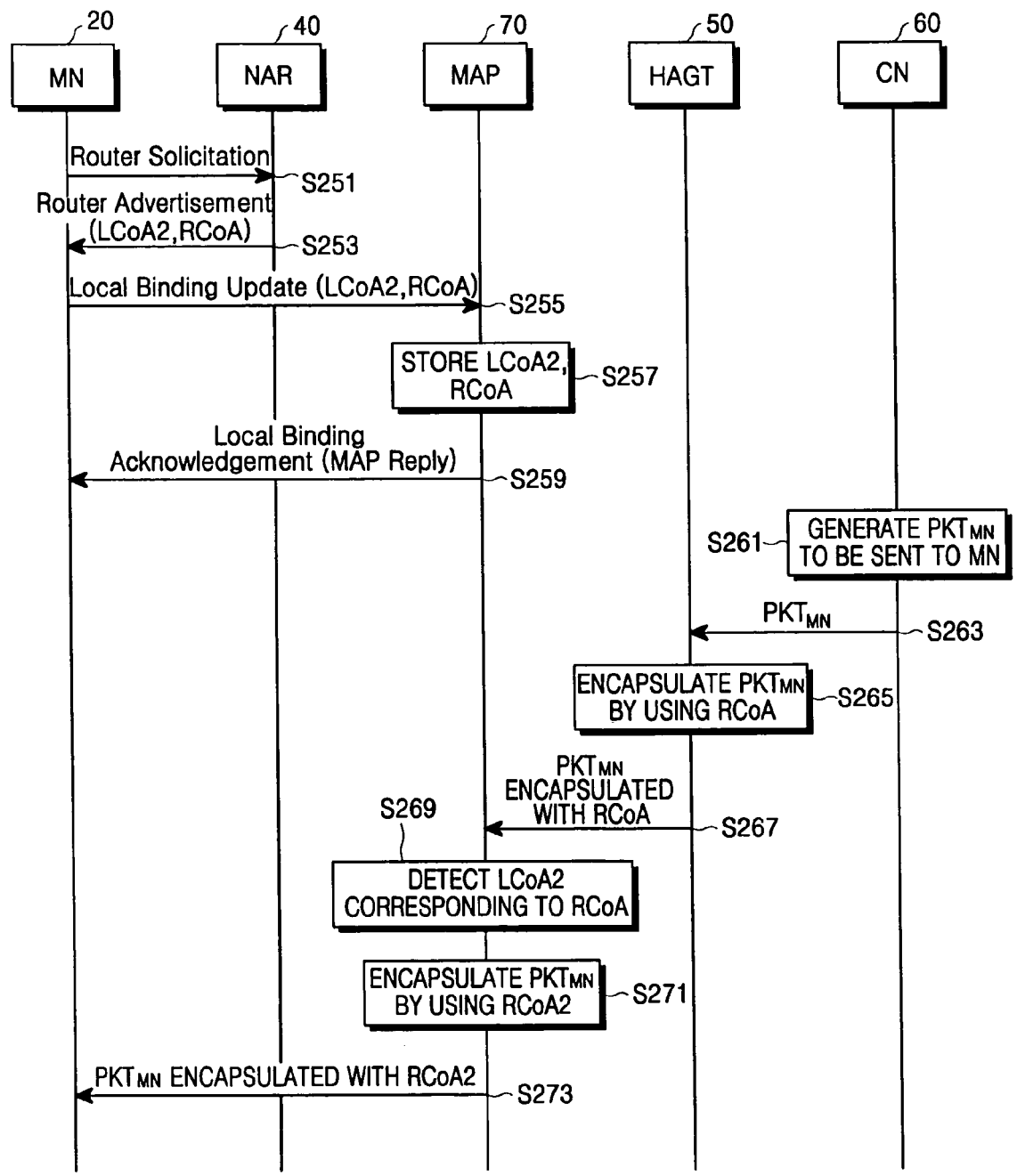

Traffic exchange procedures of an MN in an HMIPv6 network as shown in FIG. 4 are illustrated in FIGS. 5 and 6, in which FIG. 5 illustrates movement between MAPs and FIG. 6 illustrates movement in the same MAP.

Referring to FIGS. 4 and 5, when the MN 20 moves from another MAP domain to the MAP 70 domain, the MN 20 sends a router solicitation to the PAR 30 in S201. As a router advertisement to the router solicitation, the PAR 30 delivers network information thereof as well as MAP 70 information to the MN 20 in S203.

The MN 20 generates a LCoA1 by using the PAR 30 network information, generates an RCoA using the MAP 70 information, and the registers the LCoA1 and RCoA in the MAP 70 in S205, S207 and S209. That is, the MN 20 executes a local binding update. Thereafter, bi-directional tunneling is configured between the MAP 70 and the MN 20. That is, the MAP 70, upon receiving a packet having a destination address of the RCoA, tunnels the packet to the MN 20 using the LCoA1, and traffic that the MN 20 desires to transmit is tunneled to the MAP 70, which in turn transmits the traffic again to the corresponding destination address.

In addition, the MN 20 registers its RCoA and HA in its HAGT and CN in S211, S213 and S215. That is, the MN 20 executes a binding update. By executing such a binding update, the destination address of a packet transmitted from the HAGT 50 or the CN 60 to the MN 20 has an RCoA, and the MAP 70 receives and tunnels this packet to the MN 20.

For example, when the CN 60 has data to transmit to the MN 20, the CN 60 generates a packet (PKTMN) to be transmitted to the MN 20 using the HA of the MN 20 in S217, and delivers the PKTMN to the HAGT 50 of the MN 20 in S219. Then, the HAGT 50 detects the RCoA of the MN 20 based upon the binding update information of the MN 20, encapsulates the PKTMN using the RCoA in S221, and delivers the encapsulated PKTMN to the MAP 70 in S223.

Upon receiving the encapsulated PKTMN, the MAP 70 detects the RCoA from the destination address of the encapsulated PKTMN and then detects the LCoA1 corresponding to the detected RCoA in S225. The MAP 70 then again encapsulates the PKTMN using the LCoA1 in S227, and delivers the encapsulated PKTMN to the MN 20 in S229.

When the MN 20 moves to another AR (i.e., NAR) 40 in the MAP 70 domain, the MN 20 composes its LCoA2 using the NAR 40 network information received from the NAR 40 and the MAP 70 information and registers the LCoA2 in the MAP 70, thereby executing a local binding update.

FIG. 6 illustrates the above-described procedures and packet transmission procedures to the moved MN 20.

Referring to FIGS. 4 and 6, upon moving to the NAR 40, the MN 20 sends a router solicitation to the NAR 40 in S251, and as a router advertisement to the router solicitation, the NAR 40 delivers network information thereof as well as MAP 70 information to the MN 20 in S253.

The MN 20 generates the LCoA 2 using the network information of the NAR 40, and detects whether the MN 20 is located in a MAP domain that is the same as or different from the previous one. Since FIG. 6 illustrates an example of movement in the same MAP domain, the MN 20 uses the previously composed RCoA as is. The MN 20 registers the newly generated LCoA2 and the previously composed RCoA in the MAP 70 in S255, S257 and S259. That is, the MN 20 executes a local binding update. Then, the address registration of the MN 20 has been accomplished, and an additional registration in the HAGT 50 or the CN 60 is not necessary.

When the address registration is accomplished as above, by-directional tunneling is configured between the MAP 70 and the MN 20 as described with reference to FIG. 5. That is, upon receiving a packet having destination address of the RCoA, the MAP 70 tunnels the packet to the MN 20 using the LCoA2 stored in the MAP 70, and traffic that the MN 20 desires to transmit is tunneled to the MAP 70, which again transmits the traffic to corresponding destination address.

In this case, procedures for transmitting data to the MN 20 from the CN 60 are similar to those described with reference to FIG. 5. That is, S261 to S273 correspond to S217 to S229 in FIG. 5. Accordingly, S261 to S273 have not been described in detail.

As described above, when HMIPv6 is used, additional registration procedures in the HAGT 50 or the CN 60 can be omitted at a hand-over in the same MAP domain. Thus, it is possible to reduce hand-over latency at a hand-over in the same MAP domain. However, even this process cannot completely eliminate hand-over latency. That is, when the MN 20 moves from the PAR 30 to the NAR 40, a hand-over latency occurs. Accordingly, the PAR 30 discards a packet transmitted from the MAP 70. Thus, packet loss problems still take place even in the HMIPv6 network.

As another solution to reduce hand-over latency, there is FMIPv6. FMIPv6 uses a system configuration of an MIPv6 network as is. FMIPv6 can previously process information for a NAR and compose an NCoA before the movement of the MN to a new network in order to reduce hand-over latency as well as minimize packet loss.

Figure 7:
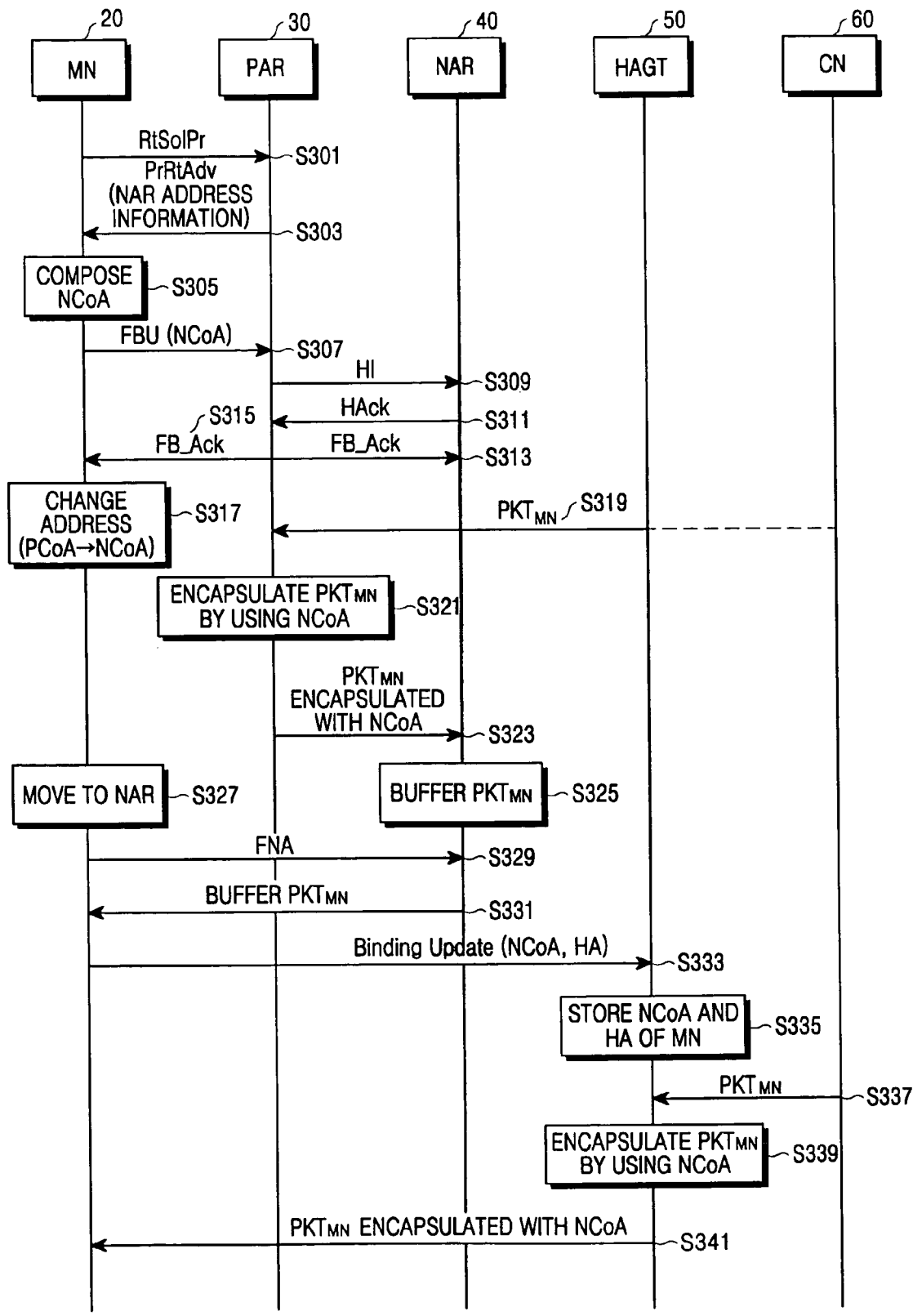
FIGS. 7 and 8 are diagrams of fast hand-over procedures for traffic exchange of an MN in a MIPv6 network.
Figure 8:
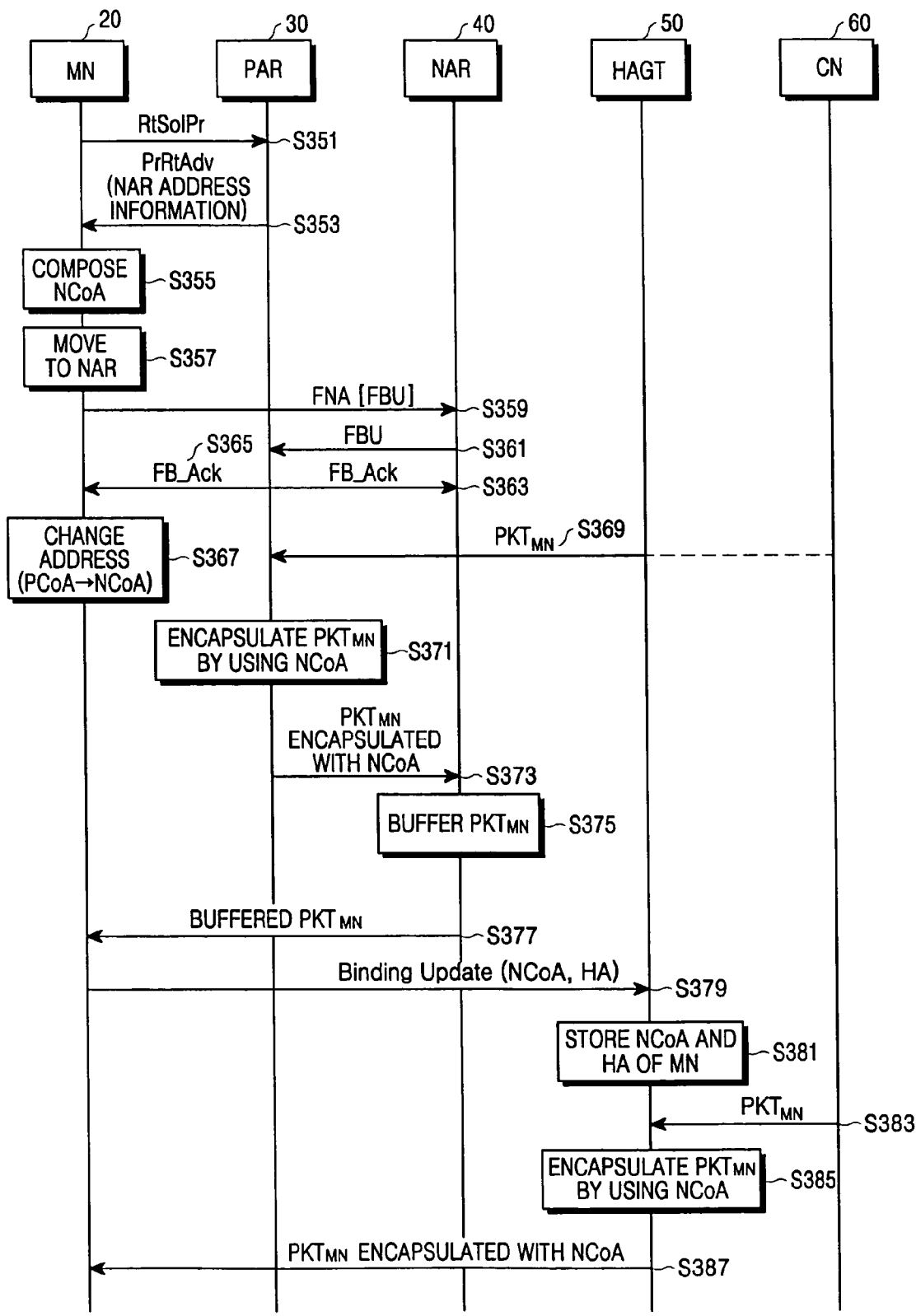

FIGS. 7 and 8 show examples of such FMIPv6 procedures. FIG. 7 shows an example in which the MN 20 changes its dynamic address to dynamic address generated by using information received from a NAR before the MN 20 actually moves to a new area (predictive). FIG. 8 shows an example in which the MN 20 moves to a predicted area before changing its address (reactive).

FMIPv6 procedures in which the MN 20 is predictive will be described with reference to FIG. 7 as follows.

While the MN 20 is exchanging traffic using the previous dynamic address (PCoA) generated using the PAR 30 network information after having accessed the Internet by a PAR 30, upon receiving information for a new network (i.e., SSID in the case of a wireless LAN), the MN 20 transmits a message containing a second hierarchical address of the new network (i.e., a Router Solicitation Proxy (RTSolPr) message) to the PAR 30 in S301. Upon receiving this message, the PAR 30 transmits a message containing the IPv6 address of a NAR 40 and a second hierarchical address (i.e., a Proxy Router Advertisement (PrRtAdv) message) to the MN 20 in S303. Upon receiving this message, the MN 20 composes a new dynamic address (NCoA) to be used in the new network using the network address information in the IPv6 address of the NAR 40 and its interface identifier information in S305, and transmits a message (i.e., a Fast Binding Update (FBU) message) containing this address information (NCoA) to the PAR 30 in S307.

Upon receiving the FBU message, the PAR 30 transmits a message (i.e., a Hand-over Initiate (HI) message) containing the NCoA address information to the NAR 40 in order to judge the availability of the NCoA address in S309. Then, the PAR 30 receives a Hand-over Acknowledgement (HAck) message from the NAR 40 in S311, and transmits an FB_Ack message to the MN 20 and the NAR 40 in S313 and S315.

Upon receiving the FB_Ack message, the MN 20 changes its dynamic address from PCoA to NCoA in S317.

The PAR 30 tunnels a packet having a destination address of PCoA from the HAGT 50 or the CN 60 using the NCoA. That is, when the packet (PKTMN) having a destination address of PCoA is received from the HAGT 50 or the CN 60 in S319, the PAR 30 encapsulates the PKTMN using the NCoA in S321 and delivers the PKTMN to the NAR 40 in S323.

In S325, the NAR 40 buffers the PKTMN (which is encapsulated by the NCoA) before the MN 20 accesses a network where the NAR 40 is located.

When the MN 20 with its dynamic address changed in S317 above moves to a NAR area in S327, the MN 20 transmits a Fast Neighbor Advertisement (FNA) message to the NAR 40 in order to advise the NAR 40 of the movement of the MN 20 in S329.

Upon receiving the FNA message from the MN 20, the NAR 40 transmits a packet or packets, which have been buffered so far, to the MN 20 in S331. After a fast hand-over is accomplished as above, the MN 20 delivers and registers the dynamic address (NCoA) to be used in the NAR 40 and HA into the HAGT 50 in S333 and S335, in order to execute a binding update.

After executing a binding update as above, when a PKTMN is delivered from the CN 60 to the HAGT 50 S337, the HAGT 50 encapsulates the PKTMN using the NCoA in S339, and delivers the encapsulated PKTMN to the MN 20 in S341.

Before registering the changed CoA (i.e., NCoA) in the HAGT 50 or the CN 60 (e.g., binding update), the MN 20 sets the PCoA as the source address of a packet, which the MN 20 desires to transmit, and tunnels (not shown) the packet to the PAR in order to minimize packet loss owing to hand-over.

FMIPv6 procedures in which the MN 20 is reactive are described below with reference to FIG. 8.

Referring to FIG. 8, after the NCoA is composed through predetermined procedures S351, S353 and S355, when the MN 20 moves to a NAR area in S357, the MN 20 transmits an FNA message to the NAR 40 in order to advise the NAR 40 of the movement of the MN 20 in S359.

The above procedures S351, S353 and S355 are similar to the procedures S301, S303 and S305 described with reference to FIG. 7, and accordingly, have not been described in detail. The FNA message delivered in S359 above contains a Fast Binding Update (FBU) message that includes the address information of NCoA.

Then, the NAR 40 delivers the NCoA on the FBU message to the PAR 30 in S361. Upon receiving the NCoA as above, the PAR 30 delivers an FB_Ack message to the MN 20 and the NAR 40 in S363 and S365.

Upon receiving the FB_Ack message, the MN 20 changes its dynamic address from PCoA to NCoA in S367.

When a packet (PKTMN) is received from the CN 60, the PKTMN is processed according to procedures S369 to S387 as illustrated in FIG. 8. These procedures S369 to S387 are similar to the PKTMN processing procedures S319 to S341 as illustrated in FIG. 7 except that after the MN 20 is moved to the NAR S327, S329 of advising the movement to the NAR 40 is executed before the above packet processing procedures in FIG. 7. Thus, the procedures S369 to S387 have not been described in detail.

The FMIPv6 procedures illustrated in FIGS. 7 and 8 deliver a PKTMN to the MN 20 commonly along two paths. That is, the packet delivery path before a binding update differs from that after a binding update. Before the MN 20 executes a binding update, the MN 20 receives a packet delivered from the CN 60 via the PAR 30, and after binding update, the MN 20 receives a packet directly from the CN 60 without passing through the PAR 30. In other words. before the MN 20 executes a binding update, the packet headed for the MN 20 is delivered through the PAR 30 and buffered in the NAR 40, and then delivered to the MN 20 after actual movement of the MN 20. However, after a binding update, the packet headed for the MN 20 is delivered to the MN 20 according to the NCoA in the NAR 40.

Then, if it takes a long time for the MN 20 to move or the binding update time is delayed so that a number of packets are buffered in the NAR 40, some of the packets can be delivered to the MN 20 via the NAR 40 before all of the buffered packets are delivered to the MN 20.

This can cause a problem in that the packets are delivered to the MN 20 in the wrong order. This wrong order of the packets can remarkably degrade the performance of an application program. When the packets are received in the wrong order, a receiving side of the packets generates an acknowledgment signal requesting packets in the correct order. As a result, this causes a duplicated acknowledgment, and when the transmitting TCP receives 3 or more duplicated acknowledgments, the transmitting TCP promptly changes into its retransmission and recovery state. In this state, the transmitting TCP retransmits its own traffic and reduces the size of its congestion window. The reduced congestion window size also degrades the TCP transmitting performance.

Also, in case of UDP based multimedia traffic, packet loss or packet disordering degrades quality considerably as a drawback.

Therefore, where the MN moves to a new network, a mechanism capable of preventing not only packet loss but also packet disordering is essential.

The following is a detailed description of exemplary embodiments of the present invention with reference to the accompanying drawings, in which the same reference numerals are used throughout the different drawings to designate the same or similar components. In the following description, a detailed description of known functions and configurations incorporated herein have been omitted when it obscures the subject matter of the present invention.

Figure 9:
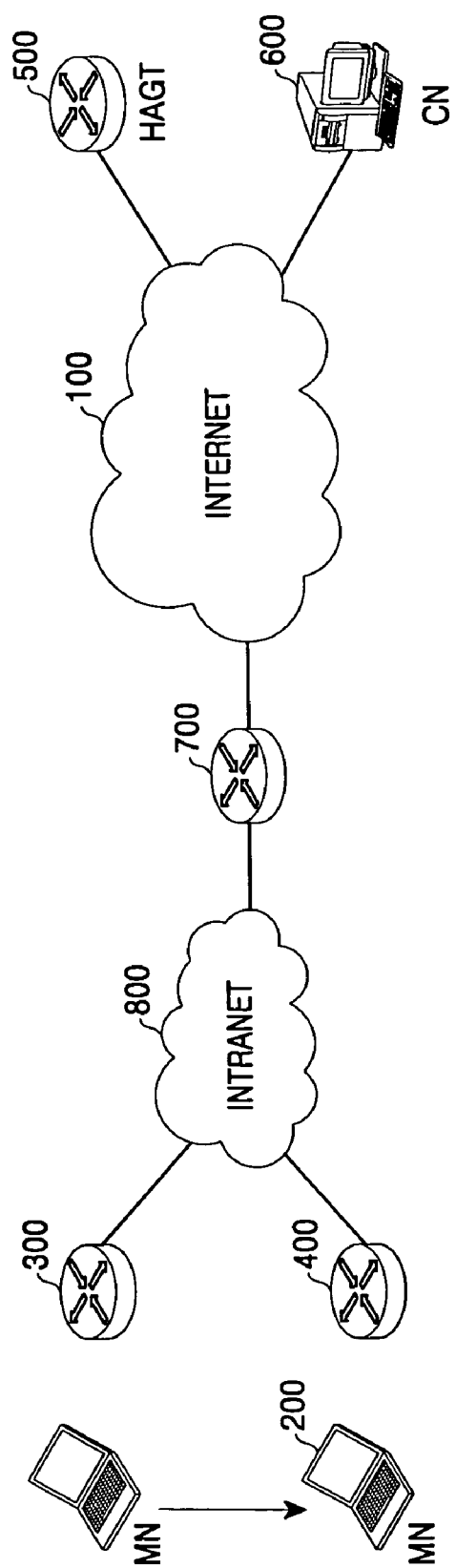
FIG. 9 is a diagram of a MIPv6 network according to an embodiment of the present invention.

FIG. 9 is a diagram of an MIPv6 network according to an embodiment of the present invention. Referring to FIG. 9, an MIPv6 network according to this embodiment of the present invention includes Access Routers (ARs) 300 and 400 for managing Internet access of an MN 200, a Home Agent (HAGT) 500 for managing the HA of the MN 200 and a MAP 700 provided between the ARs 300 and 400 and the Internet 100 to form an intranet 800 of the ARs 300 and 400.

An AR 300 which provides Internet access service to the MN 200 before the MN 200 moves or roams is called a Previous AR (PAR), and an AR 400 which provides Internet access service to the MN 200 after the MN 200 has roamed or moved is called a New AR (NAR).

The MAP 70 forming between the ARs 300 and 400 acts as a type of 'local home agent' in a domain.

A CN 600 is a node or host connected to the MN 200 via the Internet 100.

The MIPv6 network having the above structure according to this embodiment of the present invention includes all characteristics of the Hierarchical MIPv6 (HMIPv6) and the Fast hand-over for MIPv6 (FMIPv6).

Figure 10:
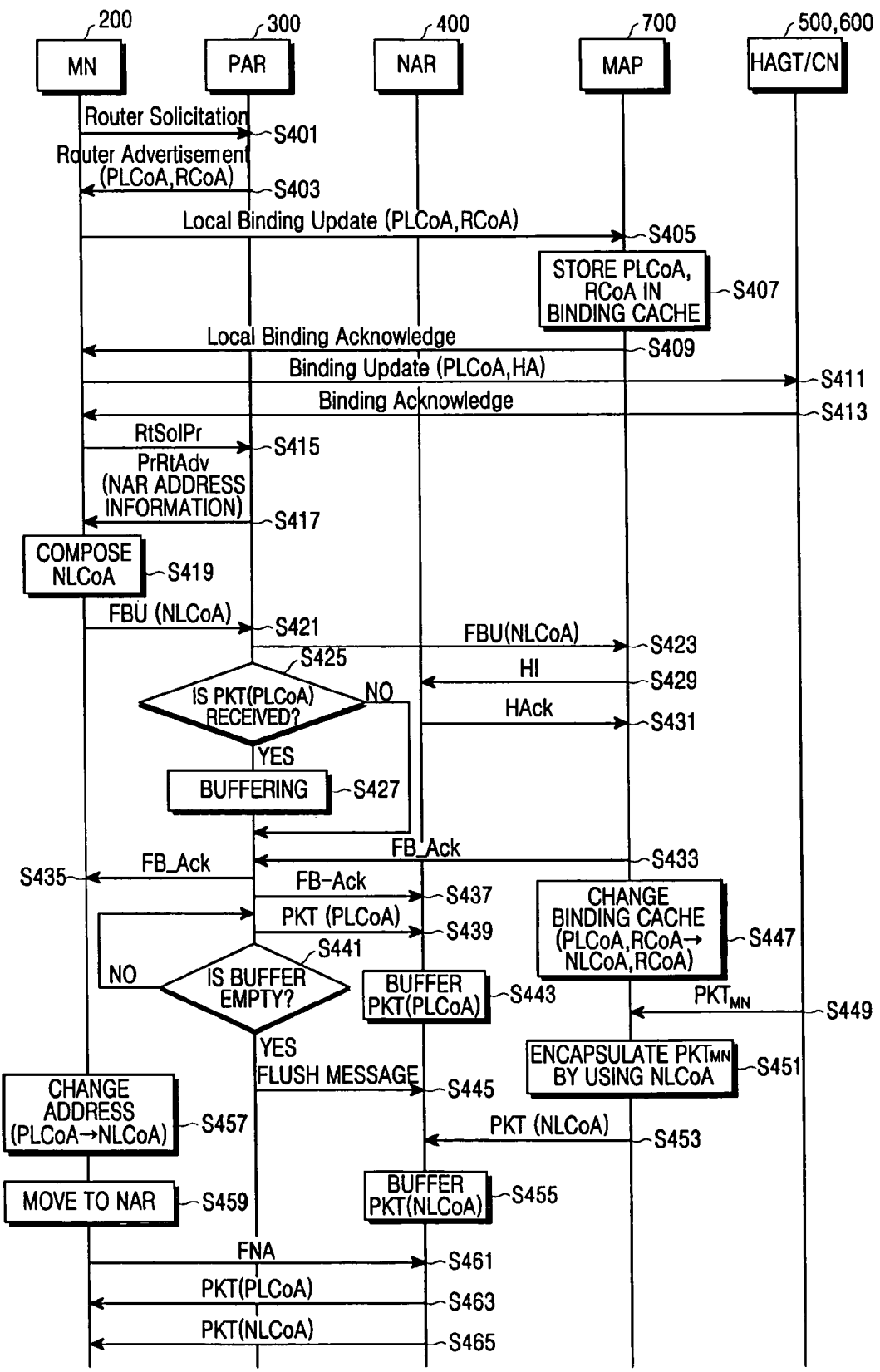
FIG. 10 is a diagram of traffic exchange procedures of an MN in a MIPv6 network according to an embodiment of the present invention.

The procedures for exchanging traffic of the MN in the MIPv6 network according to this embodiment of the present invention are illustrated in FIGS. 10 and 15. FIG. 10 shows an example in which the MN 200 changes its dynamic address to the dynamic address generated using information received from a NAR 400 before it actually moves to a new area (predictive). FIG. 15 shows an example in which the MN 200 moves to a predicted area before changing its address (reactive).

FIG. 10 is a diagram illustrating traffic exchange procedures of an MN in the mobile IPv6 network according to this embodiment of the invention.

Referring to FIG. 10, the traffic exchange procedures in the MIPv6 network according to this embodiment of the present invention are described as follows. That is, the traffic exchange procedures according to this embodiment of the present invention for the predictive situation are as follows.

When the MN 200 moves from another MAP domain to the MAP 70 domain, the MN 200 sends a router solicitation to the PAR 300 in S401. As a router advertisement to the router solicitation, the PAR 300 delivers network information thereof as well as MAP 70 information to the MN 200 in S403. Messages for the router solicitation in S401 and the router advertisement in S403 are preferably message types defined by the HMIPv6 protocol.

The MN 200 generates a Previous Local CoA (PLCoA) using network information of the PAR 300 and generates an RCoA using the MAP 700 information, and then registers the PLCoA and RCoA in the MAP 700. That is, the MN 200 delivers the PLCoA and RCoA to the MAP 700 requesting a local binding update in S405, and the MAP 700 stores the PLCoA and RCoA in a binding cache in S407 and transmits a local binding acknowledgment in response to the local binding update request to the MN 200 in S409. Message types for the local binding request and the local binding acknowledgment for local binding update are preferably those defined by the HMIPv6 protocol.

Thereafter, bi-directional tunneling is configured between the MAP 70 and the MN 200. That is, the MAP 70, upon receiving a packet having a destination address of RCoA, tunnels the packet to the MN 200 using the PLCoA, and traffic that the MN 20 desires to transmit is tunneled to the MAP 70, which in turn again transmits the traffic to the corresponding destination address.

In addition, the MN 200 registers its RCoA and HA in the HAGT 500 and the CN 600 in S411 and S413. That is, the MN 200 executes a binding update. By executing such binding update, the destination address of a packet transmitted from the HAGT 50 or the CN 60 to the MN 20 has the RCoA, and the MAP 70 receives and tunnels this packet to the MN 20.

While the MN 200 is exchanging traffics using the previous local dynamic address (PLCoA) generated using the PAR 300 network information after having accessed the Internet by the PAR 300, when the MN 200 attempts to move to the NAR 400 upon receiving a link layer signal from an AP connected to the NAR 400, the MN 200 transmits a Router Solicitation Proxy (RTSolPr) message to the PAR 300 in S415.

Figure 11:
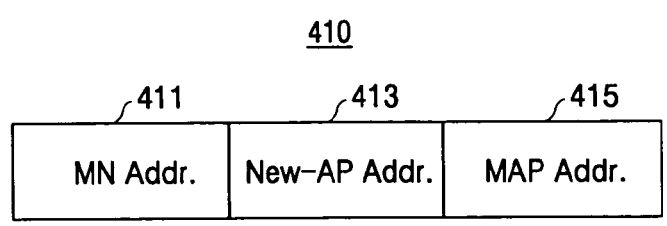
FIGS. 11 to 14 are examples of messages that are transmitted in traffic exchange of an MN in a MIPv6 network according to an embodiment of the present invention.

The RtSolPr message contains a 2nd layer address of the newly detected AP and the MAP address to which the MN is currently accessed. FIG. 11 illustrates an example of the RtSolPr message. Referring to FIG. 11, the RtSolPr message 410 includes an MN Addr. 411, which is the address information of the MN 200, New-AP Addr. 413, which is the address information of the new AP, and MAP Addr. 415, which is the address information of the MAP 70. The new AP address information 413 is a second layer address.

Upon receiving the RtSolPr message from the MN 200 in S415 above, the PAR 300 confirms which NAR is accessed to the AP using information of the second layer (e.g., link layer) of the AP contained in the message. The PAR 300 confirms whether or not a MAP that the NAR 400 can provide exists in the MAP address information transmitted from the MN 200. Then, the PAR 300 transmits a Proxy Router Advertisement (PrRtAdv) message to the MN 200 in S417.

Figure 12:
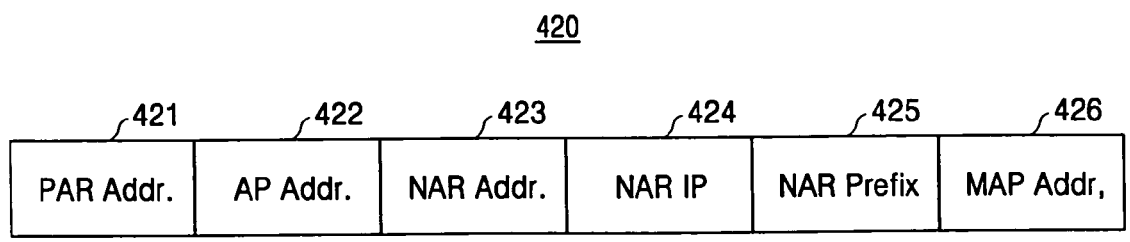

The PrRtAdv message contains link layer address information of the PAR, the AP and the NAR, IP address information and prefix information of the NAR and address information of the MAP. FIG. 12 illustrates an example of the PrRtAdv message. Referring to FIG. 12, the PrRtAdv message 420 contains PAR Addr. 421, which is address information of the PAR 300, AP Addr. 422, which is address information of the AP, NAR Addr. 423, which is address information of the NAR 400, NAR IP 424, which is IP address of the NAR, NAR prefix 425 and MAP Addr. 426, which is MAP address information. The second layer address of the PAR 300 and the NAR 400 is stored in address information 421 and 423 of the PAR 300 and the NAR 400.

Upon receiving the PrRtAdv message, the MN 200 confirms whether or not MAP address information (e.g., MAP address option) exists in the message. If MAP address information exists, the MN 200 regards movement thereof as being in the same MAP domain, and composes a New Local CoA (NLCoA) using prefix information of the NAR 400 in S419, and transmits an FBU message containing NLCoA to the PAR 300 in S421. Then, the PAR 300 relays the FBU message to the MAP 700 using the MAP address contained in the FBU message in S423.

Figure 13:
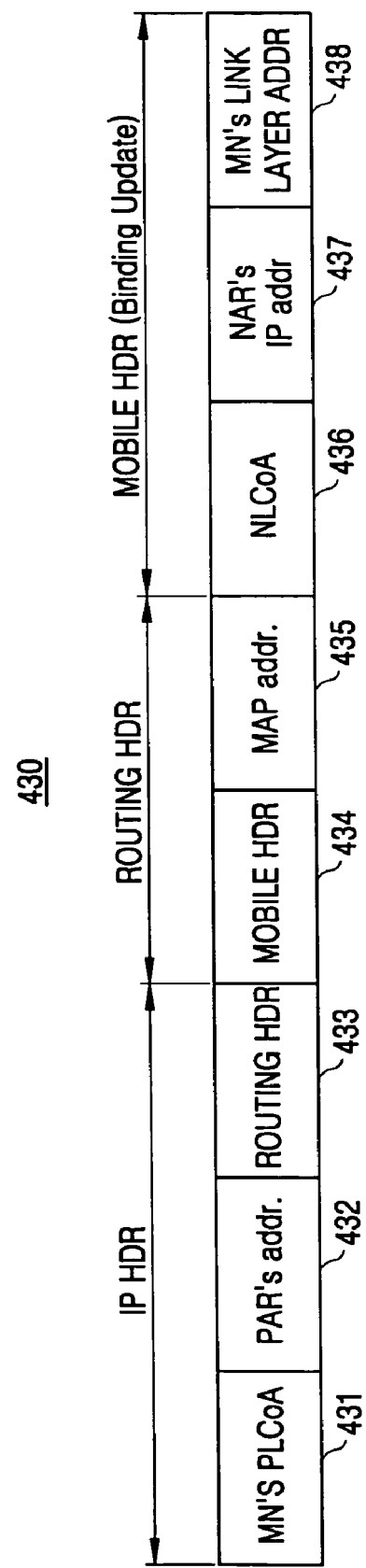

FIG. 13 illustrates the type and contents of the FBU message generated as above.

Referring to FIG. 13, the FBU message according to this embodiment of the present invention contains the PLCoA address 431 of the MN 200, the address 432 of the PAR 300, the routing header 433, the mobile header 434, the address 435 of the MAP 700, the NLCoA address 436 of the MN 200, the IP address 437 of the NAR 400 and the link layer address 438 of the MN 200.

The, MN 200 PLCoA address 431, the PAR 300 address 432 and the routing header 433 correspond to an IP header area (IP HDR), in which the MN 200 PLCoA address 431 is the source address of a corresponding message, and the PAR 300 address 432 is the destination address of a corresponding message. The routing header 433 indicates the next header information.

The, mobile header 434 and the MAP 700 address 435 correspond to the routing header (HDR), in which the mobile header 434 is the next header information and the MAP 700 address 435 is the IP address.

In addition, the MN 200 NLCoA address 436, the NAR 400 IP address 437 and the MN 200 link layer address 438 are mobile header and binding update information. The NLCoA address 436 is a dynamic address to be used by the MN 200 in the new area, and the NAR 400 IP address 437 is an IP address of the new NAR.

Referring to FIG. 10 again, when the PAR 300, after having received the FBU message, receives a PKT(PLCoA) that is a packet having a PLCoA as a destination address, the PAR 300 buffers the PKT(PLCoA) in S427.

Upon receiving the FBU message from the PAR 300, the MAP 700 transmits a Hand-over Initiate (HI) message to the NAR 400 in order to support the movement of the MN 200 in S429. The HI message contains a link layer address, the PLCoA and NLCoA of MN 200 defined by the FMIPv6 protocol and the address of the PAR 300 (e.g., the PAR address option). This option is of the same type as the PLCoA address option.

Upon receiving the HI message, the NAR 400 confirms whether or not the NLCoA that the MN 200 has attempted to use is available through an overlapped-address check. That is, the NAR 400 confirms whether or the NCoA of the MN 200 is already being used. Then, the NAR 400 transmits a Hand-over acknowledgement message (Hack message) to the MAP 700 in response to the HI message in S431.

Upon receiving the Hack message from the NAR 400, the MAP 700 assumes that fast hand-over procedures have been accomplished and transmits a Fast Binding Ack (FB_ack) message to the PAR 300 in S433. Then, the MAP 700 changes the contents of a binding cache from the PLCoA and RCoA to the NLCoA and RCoA, respectively, in S447.

Thereafter, the MAP 700 tunnels all packets headed for the MN 200 to the NLCoA.

Upon receiving the FB_ack message, the PAR 300 delivers the FB_ack message to the MN 200 and the NAR 400 in S435 and S437. That is, the PAR 300 by itself generates and transmits an FB_ack message having the PLCoA as the destination address to the MN 200 in S435, and generates and transmits an FB_ack message having the NLCoA as the destination address to the NAR 400 in S437.

Figure 14:
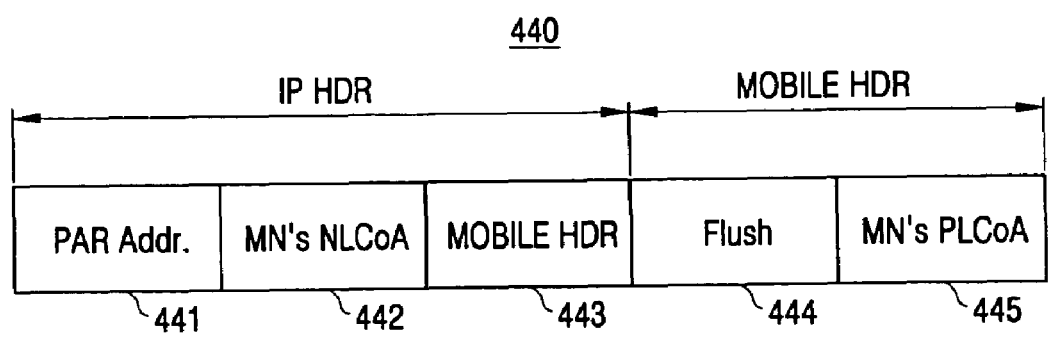

In addition, the PAR 300 tunnels packets, which have been buffered so far (i.e., PKT(PLCoA) or packets having a PLCoA as destination address), to the NAR 400. That is, the PAR 300 delivers packets to the NAR 400 in S439. Upon completely transmitting the buffered packets (that is, the buffer in the PAR 300 becomes empty) in S441, the PAR 300 transmits a message (e.g., a Flush message) indicating that there are no more packets to the NAR 400 in S445. FIG. 14 illustrates the type and contents of the Flush message.

Referring to FIG. 14, the Flush message 440 contains an IP HDR area including a source address, a destination address and next header information and mobile HDR including Flush status information (i.e., information for identifying whether or not there are no more packets) and previous dynamic address information (PLCoA of the MN). In the example shown in FIG. 14, the address 441 of the PAR 300 is source address, NLCoA 442 of the MN 200 is destination address, mobile HDR 443 is next header information, the Flush 444 is the Flush status information and the PLCoA 445 of the MN 200 is the previous dynamic address.

When a packet (PKTMN) is delivered from the HAGT 500 or the CN 600 to the MAP 700 in S449, the MAP 700 encapsulates the PKTMN with the NLCoA in S451, and transmits the encapsulated PKTMN to the NAR 400 in S453. Hereinafter the PKTMN encapsulated with the NLCoA will be referred to as 'PKT(NLCoA).'

Upon receiving the PKT(NLCoA), the NAR 400 buffers the PKT(NLCoA) in S455. That is, the NAR 400 buffers all of PKT(PLCoA) delivered from the PAR 300 and PKT (NLCoA) delivered from the MAP 700 until receiving the FNA message informing the movement of the MN 200 from the MN 200.

The PKT(PLCoA) is received earlier than the PKT (NLCoA). The NAR 400 therefore has to transmit the PKT (PLCoA) to the MN 200 prior to the PKT(NLCoA). For this purpose, the NAR 400 preferably includes a first buffer for buffering the PKT(PLCoA) and a second buffer for buffering the PKT(NLCoA).

Upon receiving the FB_ack message from the PAR 300, the MN 200 changes its dynamic address from the PLCoA to NLCoA in S457. When the MN 200 moves or roams into the NAR area in S459, the MN 200 transmits the FNA message to the NAR 400 in order to inform the NAR 400 of the movement of the MN 200 in S461.

Then, the NAR 400 first transmits the PKT(PLCoA) to the MN 200 in S463, and then the PKT(NLCoA) to the MN 200 in S465. That is, the NAR 400 transmits all contents in the first buffer before transmitting contents in the second buffer.

If the NAR 400 has not received a Flush message from the PAR 300 even after receiving the FNA message, the NAR 400 transmits the contents in the first buffer to the MN 200 until receiving the Flush message. Upon receiving the Flush message, the NAR 400 assumes that no more packets will be delivered from the PAR 300, and terminates the tunnel configured between the PAR 300 and the NAR 400. Then, the NAR 400 transmits the contents in the second buffer to the MN 200.

FIG. 15 is a diagram illustrating traffic exchange procedures of an MN in a mobile IPv6 network according to another embodiment of the invention. Referring to FIG. 15, traffic exchange procedures in the MIPv6 network according to the another embodiment of the invention are described as follows. That is, the traffic exchange procedures according to an embodiment of the present invention for the reactive situation are as follows.

When the MN 200 moves from another MAP domain to the MAP 700 domain, binding update procedures (including local binding update) for the MN 200 are equal for both the predictive and reactive situations. Thus, the binding update procedures S501 to S513 of the MN 200 are similar to S401 to S413 illustrated in FIG. 10. That is, S501 to S513 in FIG. 15 correspond to S401 to S413 in FIG. 10, respectively. Accordingly, the binding update procedures have not been described in detail.

After execution of the binding update as above, when the MN 200 composes the NLCoA through predetermined procedures S515, S517 and S519 and moves to NAR area in S521, the MN 200 transmits an FNA message to the NAR 400 in order to inform the NAR 400 of the movement of the MN 200 in S523.

The procedures S515 to S519 are similar to S415 to S419 in FIG. 10, and thus will not be described further. In the meantime, the FNA message delivered in S523 above includes an FBU message containing the NLCoA.

Then, the NAR 400 delivers the NLCoA on the FBU message to the PAR 300 in S525.

Upon receiving the FBU containing the NLCoA, the PAR 300 delivers its address information to the MAP 700 in S527, and then acknowledges the reception of a PKT(PLCoA) or a packet having PLCoA as destination address in S529 and buffers the PKT(PLCoA) in S531.

The procedures S533 to S561 below are similar to S433 to S465 shown in FIG. 10 except that the procedures of FIG. 10, in which the MN 200 moves to the NAR S459 before informing the movement to the NAR 400 in S461, are executed before packet reception in FIG. 15. Thus, the procedures S533 to S561 have not been described in detail.

Referring to FIGS. 10 and 15, the present invention applies FMIPv6 so that the NAR 400 can transmit PKT(NLCoA)s from the MAP 700 only after having transmitted all PKT (PLCoA)s from the PAR 300 so as to prevent any disorder in the packets transmitted to the MN 200. That is, the PAR 300 delivers a Flush message informing that all of the PKT (PLCoA)s from the PAR 300 are delivered, and the NAR 400 reserves transmission of the PKT(NLCoA)s from the MAP 700. This as a result can prevent any disorder in the packets.

While the present invention has been shown and described in connection with the exemplary embodiments, it will be apparent to those skilled in the art that modifications and variations can be made without departing from the spirit and scope of the invention as defined by the appended claims.

As described above, the present invention has efficiently integrated HMIPv6 and FMIPv6 in order to reduce packet loss during hand-over latency, and has defined new messages in order to prevent any disorder in packets in the application of FMIPv6. That is, by defining a Flush message for indicating that earlier received packets have all been delivered, it is possible to prevent any disorder in the packets. This has an effect of reducing packet loss and preventing packet disordering while a mobile host exchanges traffic in a MIPv6 network. Thus, this can advantageously solve the performance degradation of application layer protocol caused by packet disordering.

What is claimed is:

1. A method of exchanging traffic for a mobile node in a mobile network, the method comprising:
   upon receiving a request from a mobile node connected to a first router using a first dynamic address and having received a link layer signal from an access point connected to a second router, the first router provides network information of the second router to the mobile node as an acknowledgment to the request from the mobile node;
   receiving second dynamic address of the mobile node by the first and second routers using the network information of the second router;
   first buffering a packet headed for the first dynamic address by the first router;
   confirming whether or not the second dynamic address is available by the second router;
   executing a fast binding update of the mobile node using the second dynamic address and delivering a fast binding update complete message to the first router upon a determination by the second router that the second dynamic address is available;
   transmitting the packet buffered by the first router from the first router to the second router as an acknowledgment to the fast binding update complete message, and delivering a Flush message to the second buffer upon the packet buffered by the first router being completely transmitted to the second router;
   second buffering the packet transmitted from the first router by the second router;
   receiving and third buffering a packet headed for the second dynamic address by the second router;
   delivering the packet buffered by the second buffering from the second router to the mobile node as an acknowledgment to a delivered movement complete message indicating the movement of the mobile node from the first router to the second router; and
   delivering the packet buffered by the third buffering from the second router to the mobile node upon receiving the Flush message, wherein the Flush message comprises:
   a source address field storing an address of the first router;
   a destination address field storing the second dynamic address;
   a mobile header area (mobile HDR) field storing the next header information; and
   a MN's Previous Local CoA (PLCoA) field storing the previous dynamic address.

2. The method according to claim 1, further comprising:
   forming a local home agent connecting the first and second router into an intranet and generating a local dynamic address of the mobile node using network information of the local home agent;
   executing a local binding update by storing the first dynamic address and the local dynamic address of the mobile node in the local home agent; and
   executing a binding update by storing home address and the local dynamic address of the mobile node in a home agent.

3. The method according to claim 1, wherein the Flush message comprises:
   a field storing flag information indicating the completed transmission.

4. The method according to claim 2, further comprising changing local update information stored in the local home agent using the second dynamic address, upon a determination by the second router that the second dynamic address is available.

5. The method according to claim 4, wherein changing local update information stored in the local home agent comprises mapping the second dynamic address with the local dynamic address.

6. The method according to claim 5, further comprising changing the destination of a packet headed for home address of the mobile node to the second dynamic address and delivering the packet to the second router by the local home agent, upon the local home agent receiving the packet headed for home address of the mobile node.

7. A method of exchanging traffic for a mobile node in a mobile network, the method comprising:
   upon receiving a request from a mobile node connected to a first router using a first dynamic address and having received a link layer signal from an access point connected to a second router, the first router provides network information of the second router to the mobile node as an acknowledgment to the request from the mobile node;
   receiving second dynamic address of the mobile node by the second router using network information of the second router and a movement complete message of the mobile node;
   delivering the second dynamic address of the mobile node from the second router to the first router;

first buffering a packet headed for the first dynamic address by the first router;

executing a fast binding update of the mobile node using the second dynamic address and delivering a fast binding update complete message to the first router;

transmitting the packet buffered by the first router from the first router to the second router as an acknowledgment to the fast binding update complete message, and delivering a Flush message upon the packet buffered by the first router being completely transmitted to the second router;

second buffering the packet transmitted from the first router by the second router;

receiving and third buffering a packet headed for the second dynamic address by the second router;

delivering the packet second buffered by the second router from the second router to the mobile node; and delivering the packet third buffered by the second router from the second router to the mobile node upon receiving the Flush message, wherein the Flush message comprises:

a source address field storing an address of the first router a destination address field storing the second dynamic address;

a mobile header area (mobile HDR) field storing the next header information; and a MN's Previous Local CoA (PLCoA) field storing the previous dynamic address.

8. The method according to claim 7, further comprising:

forming a local home agent connecting the first and second router into an intranet and generating a local dynamic address of the mobile node using network information of the local home agent;

executing a local binding update by storing the first dynamic address and the local dynamic address of the mobile node in the local home agent; and executing a binding update by storing home address and the local dynamic address of the mobile node in a home agent.

9. The method according to claim 7, wherein the Flush message comprises:

a field storing flag information indicating the completed transmission.

10. The method according to claim 8, further comprising changing local update information stored in the local home agent using the second dynamic address, upon a determination by the second router that the second dynamic address is available.

11. The method according to claim 10, wherein changing local update information stored in the local home agent comprises mapping the second dynamic address with the local dynamic address.

12. The method according to claim 11, further comprising changing the destination of a packet headed for home address of the mobile node to the second dynamic address and delivering the packet to the second router by the local home agent, upon the local home agent receiving the packet headed for home address of the mobile node.

* * * * *